United States Patent [19]

Wolf

[11] 3,819,852

[45] June 25, 1974

[54] METHOD OF REDUCING THE INTERFERENCE SIGNALS DURING THE TRANSMISSION OF AF SIGNALS IN TIME-COMPRESSED FORM

[76] Inventor: Peter Wolf, Horscheltstr. 3/III, 8000 Munich 40, Germany

[22] Filed: Aug. 29, 1972

[21] Appl. No.: 284,530

[52] U.S. Cl. .................................. 178/5.6, 178/6.8

[51] Int. Cl. .............................................. H04n 5/00

[58] Field of Search ........ 178/5.6, 6.8; 179/15.55 T, 179/1 SA

[56] References Cited

UNITED STATES PATENTS 2,671,130 3/1954 Weighton ............................ 178/5.6

*Primary Examiner*—Richard Murray

*Attorney, Agent, or Firm*—John T. O'Halloran; Menotti J. Lombardi, Jr.

[57] ABSTRACT

In a known method of transmitting the sound signal associated with a television signal, the sound signal occurring during a field is stored and, subsequently to the video signal, transmitted in time-compressed form during the period of a line in the vertical blanking interval. At the place of reception, this line-by-line division of the sound signal naturally results in disturbing transients and dying-out processes. To avoid this, the invention proposes transmitting the sound signals of the individual fields with a time overlap.

1 Claim, 7 Drawing Figures

METHOD OF REDUCING THE INTERFERENCE SIGNALS DURING THE TRANSMISSION OF AF SIGNALS IN TIME-COMPRESSED FORM

BACKGROUND OF THE INVENTION

The present invention relates to a method of reducing the interference signals which develop during the transmission of a.f. signals in time-compressed form and are caused by the transmission principle.

One of the known systems for transmitting a.f. signals in time-compressed form is the so-called COM system, which is described in "Funkschau" (1970) on pages 689 to 692 and 749 to 750. At the sending end, the signal 1 occuring in each period $t_1$ is time-compressed with the aid of a storage for analog signals. As can be seen in FIG. 1*b*, the time process 1 results in a time process consisting of individual transmission intervals n1′ separated as to time and having the time width $t_1'$, which are transmitted to the place of reception periodically with the period $t_1$. (The period $t_1$ will hereinafter be referred to as "transmission period"; designations having the index ′ refer to the time-compressed a.f. signal).

This method can be used particularly in television engineering to transmit a.f. signals (such as sound signals) in time-compressed form as video signals in unused lines of a television signal as are present, for example, in the field blanking of a television signal. In the present form, however, it has the fundamental disadvantage that interference signals generally occur in the transmitted a.f. signal at the interfaces of adjoining transmission periods. There are two reasons for this:

One is that, during the transmission from the sending end to the receiving end, transients and dying-out processes are caused in the time-compressed a.f. signal at the transmission intervals, which transients and dying-out processes manifest themselves in the a.f. signal at the receiver output by changes in the signal at the interfaces of adjoining transmission periods $t_1$. (The period $t_1$ will hereinafter be referred to as the "transmission period"; designations having a "prime" index refer to the time-compressed a.f. signal.) The deviation of the signal at the receiver output from the signal at the transmitter input can be interpreted as an interference signal which repeats periodically with the transmission period $t_1$. The cause of this interference signal lies in the transmission principle itself because, during the transmission of the time-compressed — i.e. not time-continuous — a.f. signal over a practical transmission system, which will always be a system having low-pass characteristics, transients and dying-out processes are unavoidable.

Secondly, the interference signals are caused by errors in the time position of the sampling of the transmission intervals of the time-compressed a.f. signal at the receiving end. This sampling operation is necessary to be able to read the transmission intervals into the storage for analog signals which is provided at the receiving end. If the interference signal is to be kept sufficiently small, e.g. the transmission of sound signals in the television signal by the known transmission method requires accuracies in the time position of the signal sampling of several 10 ns. These accuracies can be realized only with a great circuit complexity at the receiving end.

SUMMARY OF THE INVENTION

It is an object of the present invention to avoid the above-mentioned disadvantages of the known transmission system by a modified way of transmitting the time-compressed a.f. signal.

The invention is based on the fact that in the time-compressed a.f. signal the transients at the transmission intervals must have virtually died out before the sampling of the transmission intervals begins at the receiving end. In addition, this sampling operation must be finished prior to the beginning of the dying-out processes at the transmission intervals. If these conditions are satisfied, no interference signals at the interfaces of adjoining transmission periods can occur in the a.f. signal at the receiver output.

The invention is characterized in that, at the sending end, the division of the total transmission time of the time-continuous a.f. signal into approximately equally long periods $(t_1+\Delta T)$ is carried out with a time overlap $(\Delta T)$, so that, in the time-compressed a.f. signal, the signal at the end of each transmission interval repeats at the beginning of the transmission interval immediately following as to time, with the duration $(\Delta T')$ of the repetition equalling the time-compressed overlap time.

In this manner it can also be achieved that errors in the time position of the sampling of the transmission intervals no longer manifest themselves in such interference signals at the place of reception.

The realization of this idea of invention means that per transmission period $t_1$ more a.f. information must be transmitted from the sending end to the receiving end than in the known transmission system.

At the receiving end, the evaluation of the transmitted, time-compressed a.f. signal is effected in such a manner that in each of the transmission intervals the signal is evaluated only during a particular period $(t_1')$ which is shorter than the duration $(t_1' + \Delta T')$ of the transmission intervals.

The above and other objects of the present invention will become more clearly understod from the following detailed description taken in conjunction with the accompanying drawings, in which:

DESCRIPTION OF THE PREFERRED EMBODIMENT

Figure 1A:
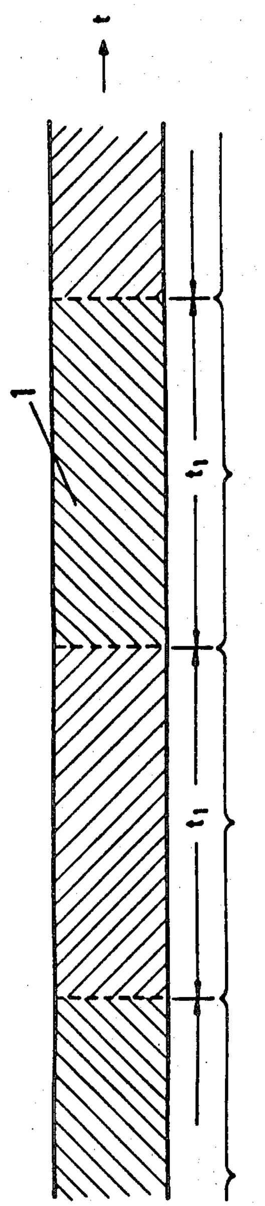
FIGS. 1*a*–1*c* illustrates the known transmission scheme.
Figure 1B:
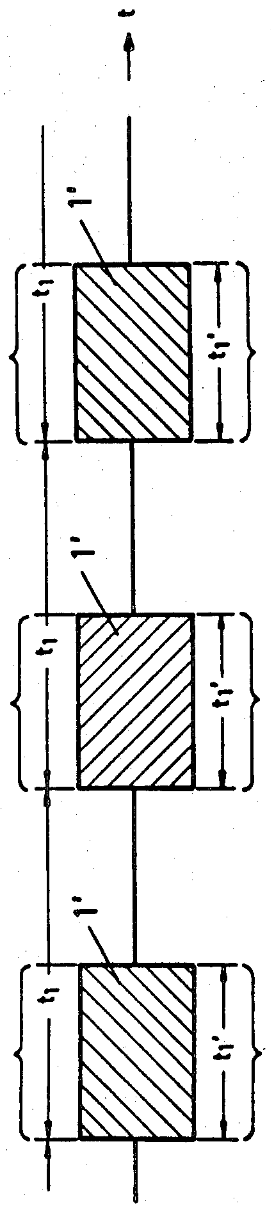

The system described in the above-cited reference will now be explained in more detail with reference to FIG. 1. The total transmission time of an a.f. signal 1 is first divided into approximately equally long periods $t_1$ (FIG. 1*a*), and, at the sending end, the signal 1 occurring in each period $t_1$ is time-compressed with the aid of a storage for analog signals. As can be seen in FIG. 1*b*, the time process results in individual transmission intervals n1′ separated as to time and having the time width $t_1'$, which are transmitted to the place of reception periodically with the period $t_1$.

At the receiving end, by time expansion of the time-compressed signal consisting of invidual transmission periods 1′ and with the aid of a second storage for analog signals, a time continuous a.f. signal 2 is obtained which corresponds to the orginal a.f. signal 1 but is delayed with respect to this signal by about the duration $t_1$ of the transmission period.

Figure 1C:
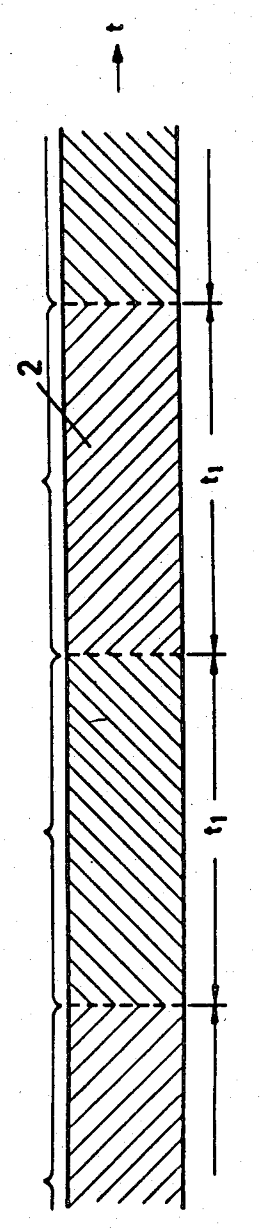
Figure 2A:
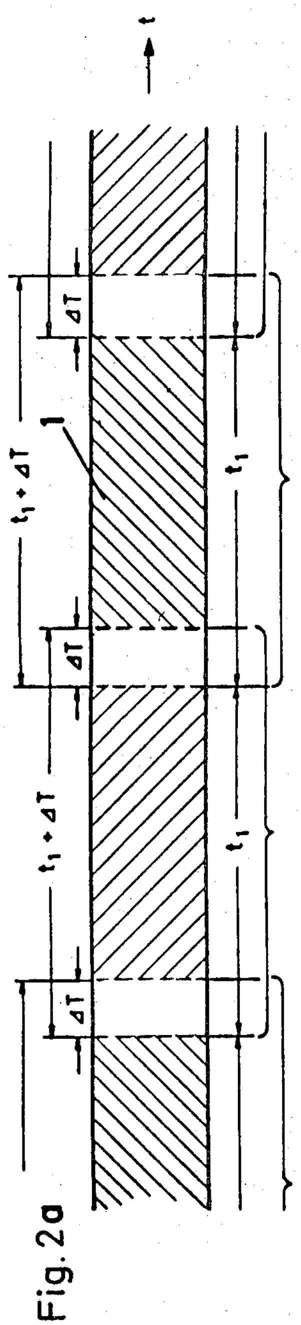
FIG. 2*a* shows the a.f. signal at the input of the transmission system.
Figure 2B:
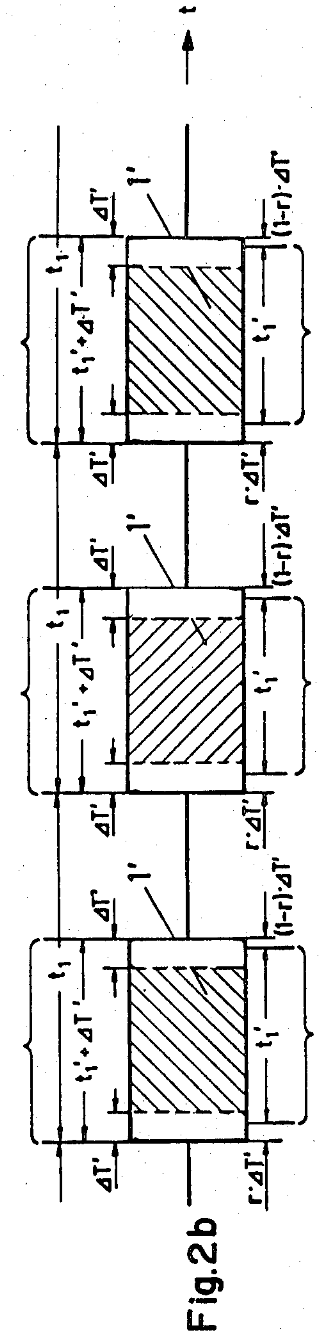
FIG. 2*b* shows the transmitted, time-compressed a.f. signal.

The inventive transmission method illustrated in FIG. 2 differs from that of FIG. 1 in that the division of the total transmission time of the time-continuous a.f. signal 1 at the transmitting end into approximately equally long periods $t_1 + \Delta T$ is done with a time overlap, with the overlapping part having the time width $\Delta T$, as shown in FIG. 2a. Thus it is achieved that, as shown in FIG. 2b, the same signal is transmitted in the time-compressed a.f. signal at the beginning of each transmission interval 1′ during the time ΔT′ — this is the time-compressed overlap time ΔT — as at the end of the immediately preceding transmission interval also during the time ΔT′.

Figure 2C:
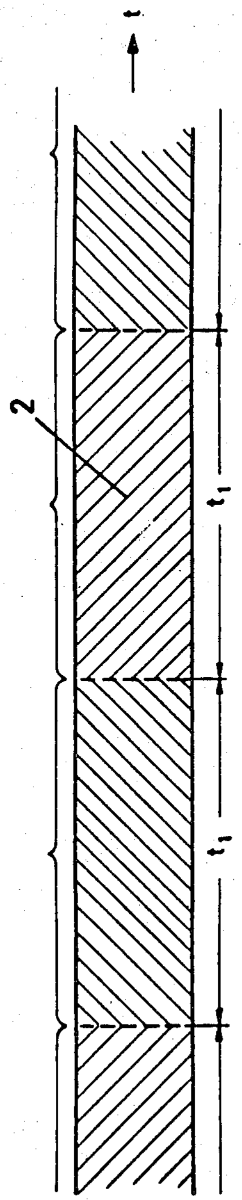
FIG. 2*c* shows the a.f. signal at the output of the transmission system.

Thus, the signal transmission becomes redundant because, instead of the signal during the time t1, which signal is necessary to maintain a continuous flow of information, the signal corresponding to that during the time $t_1 + \Delta T$ is, during each transmission interval 1′, transmitted in the time $t_1' + \Delta T'$. At the receiving end, however, in order to reproduce a continuous a.f. signal 2, only the time-compressed signal occuring within a time $t_1'$ must, during each transmission interval 1′, be read into the receiving storage, as shown in FIGS. 2b and 2c. Thus, if the overlap time ΔT is suitably chosen, the time-compressed a.f. signal has, during each transmission interval 1′, the time ΔT′ at its disposal for building up and dying out.

If the transients in the time-compressed a.f. signal at the receiving end extend in each transmission interval 1′ practically only over the time $r \cdot \Delta T'$, where $0 < r < 1$, and if the dying-out processes practically begin only in the period $(1 - r) \cdot \Delta T'$, the period $t_1'$, which is important to the signal transmission, is virtually free from transients and dying-out processes, and in the a.f. signal 2 at the output of the receiver no interference signals will occur at the interfaces of adjoining transmission periods $t_1$, as shown in FIGS. 2b and 2c.

The necessary length ΔT′ depends on the duration of the transients and dying-out processes, caused by the transmission channel, at the transmission intervals 1′ of the time-compressed a.f. signal, on which sampling errors are to be permitted at the receiving end, and on how big the interference signals in the a.f. signal 2 at the output of the receiver are allowed to be.

The length ΔT of the overlap results from the fact that, due to the time compression caused by the transmission method, the time ΔT must result in the necessary period ΔT′.

The time position of the overlap relative to the transmission period t1 can be chosen so that the overlap lies either at the beginning of each transmission period t1, as shown in FIG. 2a, or at the end. It is also conceivable that the overlap lies at the beginning and at the end of a transmission period $t_1$.

In the modification of the known transmission method of FIG. 1 which is shown in FIG. 2, the transmission time for the time-compressed a.f. signal increases for each transmission interval 1′ from $t_1'$ to $t_1' + \Delta T'$. In the case of a predetermined transmission time per transmission interval 1′, this means that, in the method according to the invention, the time compression of the a.f. signal 1 must be higher than that in known methods. As a result, the frequencies in the time-compressed a.f. signal increase, too. In the case of a predetermined upper limiting frequency of the transmission channel, the transmissible bandwidth of the a.f. signal is thus reduced. The invention is based on the perception that, by a redundant transmission process by which the bandwidth of the transmitted a.f. signal is slightly reduced, the magnitude of the interference signals at the interfaces of adjoining transmission periods $t_1$ can be considerably reduced.

The inventive way of transmitting the time-compressed a.f. signal requires no fundamental changes in the circuitry at the receiving end. At the sending end, the necessary additional investment in circuitry remains small.

Figure 3:
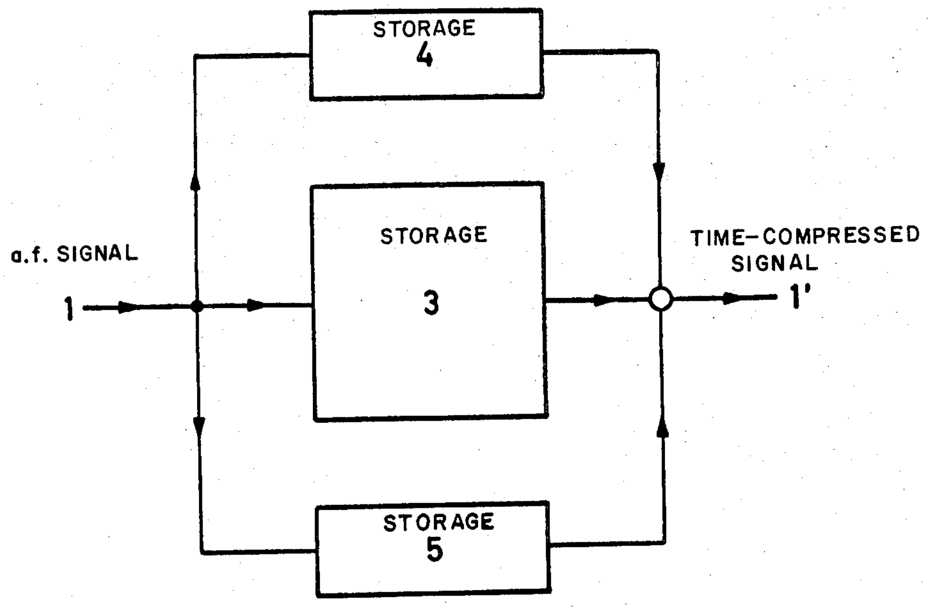
FIG. 3 shows a storage arrangement for carrying out the method in accordance to the invention.

The arrangement for carrying out the method according to the invention which is shown in FIG. 3 represents a storage arrangement for analog signals which is necessary at the sending end. This arrangement comprises a main storage 3 and two additional storages 4 and 5 of the same kind.

The storage arrangement of FIG. 3 must be capable of storing the a.f. signal 1 of FIG. 2a which occurs during the period $t_1 + \Delta T$. During the periods $t_1$, this storage operation takes place in the main storage 3 in accordance with the requirements of the sampling theorem. During the periods ΔT, the incoming a.f. signal 1 is stored in one of the two additional storages 4 or 5. Since, in case of high time compression, the read-out operation of the additional storage is not finished yet when information must already be read again into the additional storage, one additional storage (e.g. 4) is in operation during one transmission period $t_1$, and the other additional storage (e.g. 5) during the following transmission period $t_1$. The read-out operation of the storage arrangement of FIG. 3 must be controlled so that first those storage cells are read out in which the a.f. signal 1 in the period $t_1$ is stored; then, the storage cells with the a.f. signal 1 in the period ΔT must be read out. Thus, the time-compressed signal 1′ of FIGS. 2a and 2b is obtained from the a.f. signal 1.

In practice, for carrying out the method in accordance with the invention, the storage for analog signals at the sending end will not consist of 3 individual storages 3, 4, and 5, as shown in FIG. 3. Instead, a single storage for analog signals will be constructed whose storage cells are controlled by a logic circuit in accordance with the above-described requirements for carrying out the inventive method.

What is claimed is:

1. An improved method of transmitting a.f. signals wherein, at the sending end, the total transmission time of a time continuous a.f. signal is divided into approximately equally long periods $t_1$, and wherein the signal occurring in each of said periods is transmitted in time-compressed, analog form in individual transmission intervals which are separated as to time, and recovered at the place of reception by time expansion of the continuous signal, particularly for the transmission of video signals in unused lines of a television signal, wherein the improvement comprises:

dividing the total transmission time of the time continuous a.f. signal into equally long periods ($t_1 + \Delta T$), $\Delta T$ being a time overlap such that in the time-compressed a.f. signal, a portion of the signal at the end of each transmission interval repeats at the beginning of the next transmission interval in time; and evaluating said transmitted time-compressed a.f. signal at the receiving end during a time period which is shorter than the duration of the transmission interval of said time-compressed signal.

* * * * *